Patented Mar. 17, 1936

2,033,916

UNITED STATES PATENT OFFICE 2,033,916

ORGANIC PHOSPHATES

Shailer L. Bass, Midland, Mich., assignor to The Dow Chemical Company, Midland, Mich., a corporation of Michigan No Drawing. Application September 21, 1934, Serial No. 744,913

12 Claims. (Cl. 260—99.20)

This invention concerns certain new organic phosphates having the general formula:—

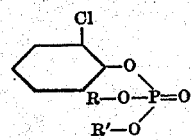

wherein R and R' represent the same or different aromatic radicals which may bear substituents that are substantially non-reactive toward phosphorus oxyhalides. Such new compounds are substantially non-flammable and possess fungicidal properties which make them useful for impregnating wood, cotton, and other cellulose products to reduce their flammability and render the same resistant to mold or other fungi. Some of these new compounds are permanent liquids at ordinary temperatures and may be used as plasticizers in preparing nitrocellulose products and the like. The invention, accordingly, consists in the new organic phosphates and method of making the same hereinafter fully described and particularly pointed out in the claims.

The herein described new organic phosphates, having the above general formula, are prepared by reacting a phosphorus oxyhalide with orthochlorophenol and, if required, another phenolic compound, e. g. phenol, naphthol, etc., or the alkali metal salts thereof. For instance, when tri-orthochlorophenyl phosphate is the product desired, a phosphorus oxyhalide is reacted directly with approximately three molecular equivalents of orthochlorophenol or an alkali metal salt thereof. When a mixed organic phosphate, e. g. orthochlorophenyl-dinaphthyl phosphate, or orthochlorophenyl-phenyl-naphthyl phosphate, is desired, a phosphorus oxyhalide is reacted successively with orthochlorophenol or an alkali metal salt thereof and another phenolic compound, e. g. phenol, trichlorophenol, phenylphenol, cresol, naphthol, etc., or the alkali metal salts thereof. The order in which the different phenolic compounds are reacted is generally not important.

In preparing my new organic phosphates, I prefer to use a free phenol rather than an alkali metal salt thereof. The free phenols are usually more readily obtainable than are their salts, they react as smoothly as do their salts, and the gaseous hydrogen halide which is evolved when a free phenol is reacted may be collected as a by-product.

To prepare a mixed phosphate of the present type, a phosphorus oxyhalide may first be reacted with sufficient orthochlorophenol to form an orthochlorophenyl phosphoric acid dihalide or a di-orthochlorophenyl phosphoric acid monohalide, as desired, and the resultant acid halide may thereafter be reacted with another phenol, e. g. phenol, naphthol, etc., to form the desired mixed triaryl phosphate product. If desired, the order in which the different phenols are reacted may be changed, e. g. the phosphorus oxyhalide may first be reacted with a phenol other than orthochlorophenol, e. g. phenol, naphthol, etc., to form the corresponding aryl phosphoric acid mono- or di-halide and the latter may thereafter be reacted with orthochlorophenol to form the triaryl phosphate product. Also, the triaryl phosphate may be prepared by reacting orthochlorophenol with any monoaryl phosphoric acid dihalide, e. g. phenyl phosphoric acid dichloride, naphthyl phosphoric acid dibromide, etc., or any diaryl phosphoric acid monohalide, e. g. dinaphthyl phosphoric acid monochloride, etc.

Each of the reactions mentioned above is carried out by heating a mixture of the reactants to a reaction temperature, preferably in the presence of a catalyst, such as metallic calcium, magnesium, or aluminum, or a chloride of magnesium, aluminum, or iron, etc. The temperature to which the mixture must be heated in order to obtain rapid reaction is, of course, dependent upon the particular reactants employed, the relative proportions of the reactants, the presence or absence of a catalyst, etc. Since, however, the reaction is accompanied by an evolution of hydrogen halide, it is necessary merely to heat the mixture to a temperature at which hydrogen halide gas is evolved. The reactions are preferably carried out at the lowest convenient reaction temperature, usually below 200° C., since at higher temperatures by-product formation may occur to an objectionable extent.

In preparing a mixed organic phosphate of the present class from a phosphorus oxyhalide and the necessary phenolic compounds, the intermediate aryl phosphoric acid halide products may be separated as such, e. g. by fractional distillation, prior to carrying out the successive reactions. However, I find it convenient after formation of such intermediate acid halide merely to add the desired quantity of a second phenol, e. g. phenol, naphthol, etc., and to continue the reaction to form the triaryl phosphate. By operating in such manner the extra steps involved in separating the intermediate acid halide are avoided. After the reactions for the formation of the triaryl phosphate are completed, the hot reaction mixture is preferably blown with air to remove hydrogen halide and other volatile impurities and then fractionally distilled to separate the triaryl phosphate product.

The following equations for the successive formation of (1) an orthochlorophenyl phosphoric acid dihalide, (2) a phenyl-orthochlorophenyl phosphoric acid monohalide, and (3) phenyl-orthocresyl-orthochlorophenyl phosphate are illustrative of the type of reactions involved in operating according to the procedure described above:—

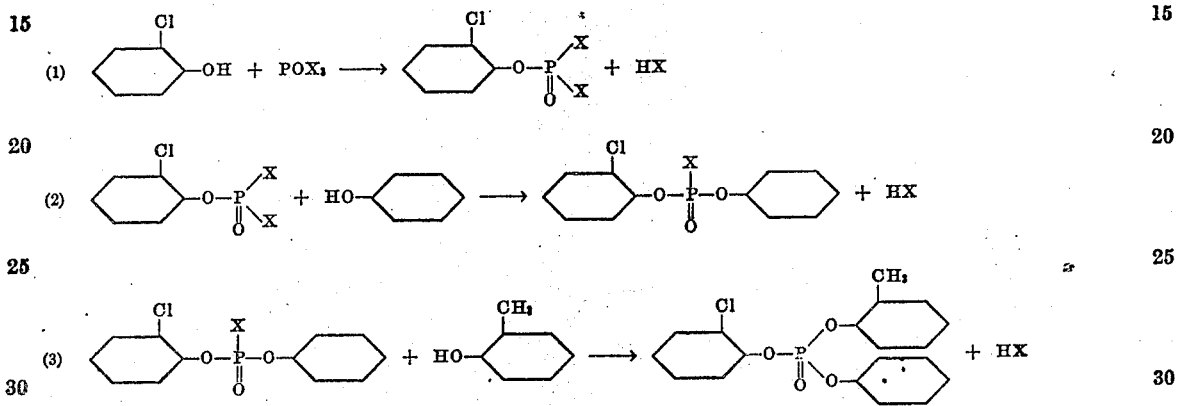

In the above equations X represents halogen.

Example 1

A mixture of 10 grams (0.1 mol.) of magnesium chloride and 771 grams (6 mols) of orthochlorophenol was heated to 80° C. Phosphorus oxychloride was then added gradually to the heated mixture with stirring while slowly raising the temperature of the latter. When the mixture was heated to about 105° C., a reaction with evolution of hydrogen chloride and generation of heat took place. Thereafter the addition of phosphorus oxychloride was continued at the rate necessary to maintain a gentle reflux until a total of 322 grams (2.1 mols) of phosphorus oxychloride had been added. The temperature was then gradually raised to 175° C. during a period of about 1 hour. Thereafter the mixture was blown with air to remove dissolved hydrogen chloride. It was then dissolved in 1 liter of ortho dichlorobenzene. The resultant solution was washed successively with a dilute hydrochloric acid solution, a dilute sodium hydroxide solution, and water, and then dried over calcium chloride. The solution was then fractionally distilled under vacuum, whereby 572 grams (1.33 mols) of substantially pure tri-orthochlorophenyl phosphate was obtained. The product consists of white crystals melting at approximately 37° C. The melted product has the specific gravity 1.408 at 40° C. with respect to water at 4° C. and boils at approximately 309° C. at 17.5 millimeters pressure. The product has the formula

Example 2

A mixture of 752.5 grams (8 mols) of phenol and 38 grams (0.4 mol.) of magnesium chloride was first heated to 90° C. for 1 hour, then cooled to 50° C. and 1227.5 grams (8 mols) of phosphorus oxychloride was added. The resultant mixture was heated with stirring to 100° C. in 1 hour. The amount of hydrogen chloride evolved during this operation corresponded to the reaction of approximately 96 per cent of the phenol used. 2057 grams (16 mols) of orthochlorophenol was then added with stirring in a period of 2 hours, while gradually heating the mixture to 125° C. Thereafter the mixture was heated to 150° C. in 2.5 hours and maintained at said temperature with continued stirring for an additional 2 hours, i. e. until the evolution of hydrogen chloride had substantially ceased. The triaryl phosphate product was separated by procedure similar to that described in Example 1. There was obtained 2431 grams (6.15 mols) of phenyl-di-orthochlorophenyl phosphate. The product was a viscous faintly yellow odorless liquid boiling at approximately 254° C. at 4 millimeters pressure and having the specific gravity 1.353 at 20° C. It has the formula

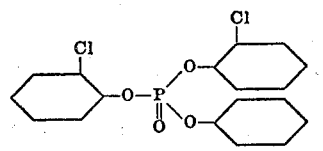

Example 3

128.5 grams (1 mol) of orthochlorophenol was reacted with 211 grams (1 mol) of phenyl phosphoric acid dichloride in the absence of any catalyst at approximately 150° C. to form phenyl-orthochlorophenyl phosphoric acid monochloride. Said product, which boils at approximately 237°–240° C. at 27.4 millimeters pressure, was separated from the reacted mixture by fractional distillation. 121.2 grams (0.4 mol) of the phenyl-orthochlorophenyl phosphoric acid monochloride was mixed with 70.5 grams (0.4 mol) of orthocyclohexylphenol and 1.9 grams (0.02 mol) of magnesium chloride and the resultant mixture was heated with stirring at temperatures gradually increasing from 130° to 150° C. for 2.6 hours. The resultant triaryl phosphate product was separated as in Example 1. There was obtained 135.4 grams (0.32 mol) of phenyl-orthocyclohexyl-phenyl-orthochlorophenyl phosphate as a viscous slightly yellowish oily liquid, boiling at approximately 317°–320° C. at 17.8 millimeters pressure and having the specific gravity 1.227 at 30° C. Said product has the formula

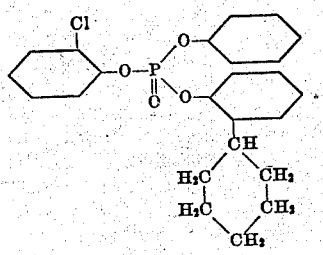

The following table describes a number of other triaryl phosphates containing the orthochlorophenyl group, each of which was prepared by procedure similar to that hereinbefore described.

of reaction and yield of product can be increased by carrying the reaction out under vacuum so as to remove hydrogen halide more effectively from the reaction mixture as it is formed.

The phenolic reactants employed in preparing a triaryl phosphate of the present class may contain substituents, such as halogen, alkyl, alkoxy, aralkyl, or alicyclic substituents, etc., which are non-reactive with the phosphorus oxyhalide under the reaction conditions employed, in which case correspondingly substituted triaryl phosphates will be obtained. Certain of such substituted triaryl phosphates of the present class are described in the foregoing examples and table. Other substituted triaryl phosphates may be prepared by reacting a phosphorus oxyhalide successively with:—(1) cresol and orthochlorophenol

| Formula of product | Boiling point | | Specific gravity | Comments |
|---|---|---|---|---|
| | °C. | mm. pressure | | |
| (structure) | 236 | 4 | 1.296 at 20° C. | Mobile, light yellow liquid. |
| (structure) | 290 | 11.5 | | White crystals melting at 48° C. |
| (structure) | 315–325 | 5 | 1.275 at 20° C. | Viscous, straw colored liquid. |
| (structure) | 312–315 | 15 | 1.370 at 20° C. | Viscous, light yellow liquid. |
| (structure) | 315–330 | 7–10 | 1.332 at 60° C. | Extremely viscous light brown liquid exhibiting a purple fluorescence. |

Instead of employing phosphorus oxychloride as a reactant in preparing my products, I may use phosphorus oxybromide or phosphorus oxyiodide. The general procedure followed in carrying out the reaction is the same regardless of the particular phosphorus oxyhalide used. Also, instead of magnesium chloride other catalysts, e. g. aluminum chloride, ferric chloride, or the metals calcium, magnesium, or aluminum, etc., can be employed in the process.

The reactions involved in preparing a triaryl phosphate of the present class are sometimes sluggish, even when carried out in the presence of a catalyst. In such case, I have found that the rate to form either cresyl-di-orthochlorophenyl phosphate or dicresyl-orthochlorophenyl phosphate; (2) 2,4-diethylphenol and orthochlorophenol to form 2,4-diethylphenyl-di-orthochlorophenyl phosphate; (3) 2-benzylphenol and orthochlorophenol to form 2-benzylphenyl-di-orthochlorophenyl phosphate; (4) orthochlorophenol and trichlorophenol to form trichlorophenyl-di-orthochlorophenyl phosphate, etc.

Other modes of applying the principle of my invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:—

1. In a method of making a triaryl phosphate having the general formula

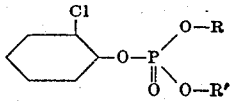

wherein R and R' represent aromatic radicals which may bear substituents that are substantially non-reactive toward a phosphorus oxyhalide, the step which consists in heating a compound selected from the class consisting of phosphorus oxyhalides and aryl phosphoric acid halides to a reaction temperature with a compound selected from the class consisting of orthochlorophenol and alkali metal salts thereof.

2. In a method of making a triaryl phosphate having the general formula

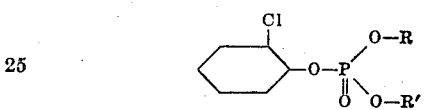

wherein R and R' represent aromatic radicals which may bear substituents that are substantially non-reactive toward a phosphorus oxyhalide, the step which consists in heating a phosphorus oxyhalide to a reaction temperature with orthochlorophenol.

3. In a method of making a triaryl phosphate having the general formula

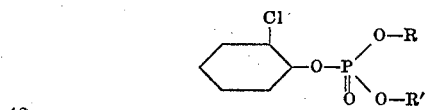

wherein R and R' represent aromatic radicals which may bear substituents that are substantially non-reactive toward a phosphorus oxyhalide, the step which consists in reacting an aryl phosphoric acid halide with orthochlorophenol.

4. In a method of making a mixed triaryl phosphate having the general formula

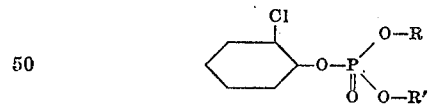

wherein R and R' represent aromatic radicals which may bear substituents that are substantially non-reactive toward a phosphorus oxyhalide, the steps which consist in heating a phosphorus oxyhalide to a reaction temperature with a phenolic compound to form a corresponding aryl phosphoric acid halide, and thereafter heating the latter to a reaction temperature with at least one other phenolic compound to form a triaryl phosphate, at least one of said phenolic compounds being of the class consisting of orthochlorophenol and alkali metal salts thereof.

5. In a method of making a mixed triaryl phosphate having the general formula

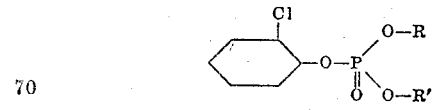

wherein R and R' represent aromatic radicals which may bear substituents that are substantially non-reactive toward phosphorus oxychloride and wherein at least one of said radicals R and R' is not the orthochlorophenyl radical, the steps which consist in heating phosphorus oxychloride to a reaction temperature with not more than twice its molecular equivalent of a phenolic compound selected from the class consisting of orthochlorophenol and alkali metal salts thereof, to form an orthochlorophenyl phosphoric acid chloride, and heating the latter to a reaction temperature with sufficient other phenolic compound to form a mixed triaryl phosphate.

6. In a method of making tri-orthochlorophenyl phosphate, the step which consists in heating phosphorus oxychloride to a reaction temperature with about 3 times its molecular equivalent of orthochlorophenol.

7. In a method of making phenyl-di-orthochlorophenyl phosphate, the steps which consist in heating phosphorus oxychloride to a reaction temperature with approximately its molecular equivalent of phenol to form phenyl phosphoric acid dichloride, and thereafter heating the latter to a reaction temperature with sufficient orthochlorophenol to form the desired mixed triaryl phosphate product.

8. In a method of making di-phenyl-orthochlorophenyl phosphate, the steps which consist in heating phosphorus oxychloride to a reaction temperature with approximately twice its molecular equivalent of phenol to form di-phenyl phosphoric acid monochloride, and thereafter heating the latter to a reaction temperature with sufficient orthochlorophenol to form the desired mixed triaryl phosphate product.

9. A triaryl phosphate having the general formula

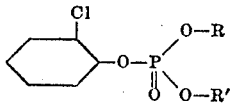

wherein R and R' represent aromatic groups.

10. Tri-orthochlorophenyl phosphate, a crystalline compound melting at approximately 35° C., boiling at approximately 309° C. at 17.5 millimeters pressure, and having the formula

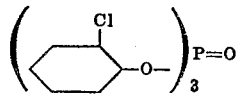

11. Phenyl-di-orthochlorophenyl phosphate, a viscous liquid boiling at approximately 254° C. at 4 millimeters pressure, having the specific gravity 1.353 at 20° C., and having the formula

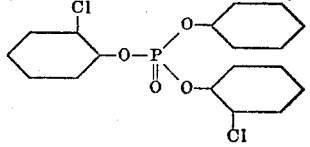

12. Di-phenyl-orthochlorophenyl phosphate, a mobile liquid boiling at 236° C. at 4 millimeters pressure, having the specific gravity 1.298 at 20° C., and having the formula

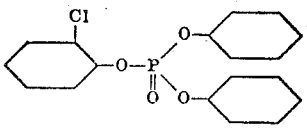

SHAILER L. BASS.